US008033820B2

(12) United States Patent
Yu

(10) Patent No.: US 8,033,820 B2
(45) Date of Patent: Oct. 11, 2011

(54) HOT RUNNER SYSTEM FOR INJECTION MOLDING MACHINE

(75) Inventor: Young Hee Yu, Seoul (KR)

(73) Assignee: Yudo Co., Ltd., Gyeonggi-do (KR)

( * ) Notice: Subject to any disclaimer, the term of this patent is extended or adjusted under 35 U.S.C. 154(b) by 32 days.

(21) Appl. No.: 11/783,310

(22) Filed: Apr. 9, 2007

(65) Prior Publication Data

US 2007/0237854 A1      Oct. 11, 2007

(30) Foreign Application Priority Data

Apr. 10, 2006   (KR) ................. 10-2006-0032488

(51) Int. Cl.
*B29C 45/20*   (2006.01)
*B29C 45/74*   (2006.01)

(52) U.S. Cl. ........ 425/568; 425/549; 425/564; 425/566; 425/572; 264/328.15

(58) Field of Classification Search .......... 425/562–566, 425/568, 572, 549, 569; 264/328.1, 328.9, 264/328.12, 328.14, 328.15
See application file for complete search history.

(56) References Cited

U.S. PATENT DOCUMENTS

| | | | | |
|---|---|---|---|---|
| 4,682,945 A | * | 7/1987 | Schad | 425/549 |
| 5,208,052 A | * | 5/1993 | Schmidt et al. | 425/549 |
| 6,086,356 A | * | 7/2000 | Yu | 425/564 |
| 6,238,203 B1 | * | 5/2001 | Koh | 425/562 |
| 6,261,084 B1 | * | 7/2001 | Schmidt | 425/564 |
| 6,368,542 B1 | * | 4/2002 | Steil et al. | 264/328.14 |
| 7,244,118 B2 | * | 7/2007 | Olaru | 425/568 |
| 2004/0043102 A1 | * | 3/2004 | Ho et al. | 425/567 |
| 2005/0064063 A1 | * | 3/2005 | Olaru | 425/568 |
| 2005/0147713 A1 | * | 7/2005 | Hagelstein et al. | 425/549 |
| 2005/0225000 A1 | * | 10/2005 | Tabassi | 264/40.1 |
| 2006/0065991 A1 | * | 3/2006 | Tabassi et al. | 264/40.5 |
| 2006/0193942 A1 | * | 8/2006 | Fairy | 425/568 |
| 2007/0212444 A1 | * | 9/2007 | Fairy | 425/564 |
| 2007/0292557 A1 | * | 12/2007 | Dewar et al. | 425/564 |
| 2008/0088047 A1 | * | 4/2008 | Trudeau | 264/40.1 |

FOREIGN PATENT DOCUMENTS

| | | | | |
|---|---|---|---|---|
| JP | 04348923 A | * | 12/1992 | |
| JP | 05177664 A | * | 7/1993 | |

* cited by examiner

*Primary Examiner* — Joseph Del Sole
*Assistant Examiner* — Dimple Bodawala
(74) *Attorney, Agent, or Firm* — Rosenberg, Klein & Lee

(57) ABSTRACT

A hot runner system for an injection molding machine capable of increasing durability of the nozzle includes a manifold having a resin injecting hole extending therethrough in its inner portion, a nozzle having a piston guide bushing formed at its upper end inserted into the nozzle seated groove of the manifold, a manifold guide bushing for surrounding and threadedly engaging with an upper portion of the piston guide bushing of the nozzle, and a fastening bushing for receiving an outer surface of the manifold guide bushing and threadedly engaging with an inner circumferential surface defining the nozzle seated groove of the manifold so that the manifold guide bushing is fastened by the fastening bushing to the inner circumferential surface defining the nozzle seated groove of the manifold.

3 Claims, 5 Drawing Sheets

PRIOR ART

PRIOR ART

HOT RUNNER SYSTEM FOR INJECTION MOLDING MACHINE

CROSS-REFERENCE TO RELATED APPLICATION

The present application claims priority from Korean Patent Application No. 10-2006-0032488, filed Apr. 10, 2006, the entire contents of which are hereby incorporated by reference.

FIELD OF THE INVENTION

The present invention relates to a nozzle combining structure of a hot runner system for an injection molding machine capable of increasing durability of the nozzle.

BACKGROUND ART

Generally, a Hot Runner System refers to a system for injecting melted resin into the inside of an injection mold under high pressure while maintaining the melted resin at high temperature on injecting the melted resin into the injection mold.

This hot runner system has been researched and developed constantly for reducing the wasted resin in manufacturing a plastic injection product. As is shown in FIGS. 1 and 2, the typical hot runner systems are implemented inside a mold in which a plurality of flat plates, i.e., a clamping plate 1, a space plate 2, a holding plate 3, and a cavity plate 4 in this order from the upper side are laminated.

A hot runner system 10 comprises a manifold 15 for dividing and supplying melted resin into several desired sites, a nozzle 20 fluidly connected to the manifold 15, and a cylinder 25 for injecting the melted resin by opening/closing the nozzle 20.

The manifold 15 is implemented inside the space plate 2 and maintains the melted resin supplied from an injection molding machine at high temperature by the heater (not shown).

Inside the manifold 15 are formed a plurality of resin traveling passages 16 like a grid type and a plurality of resin injecting holes 17 fluidly connected to the resin traveling passages 16.

The position in which the resin injecting hole 17 is formed on the manifold 15 depends on the volume and injection conditions etc., of the injection molding machine as implemented.

On the resin injecting hole 17 is firmly mounted a nozzle 20 for injecting the melted resin into the inside of the injection mold.

The nozzle 20 not only serves to keep the temperature of the melted resin so that the melted resin traveled through the manifold 15 is not solidified, but also serves to dispense the melted resin into the injection mold from the passage.

The distal end of the nozzle 20 is fixed to the surface of the mold, When the melted resin is dispensed through the nozzle 20, an amount by which the resin is dispensed into the mold is adjusted by raising/lowering actions of the piston 26 provided within the cylinder 25.

Then, the raising/lowering actions of the piston 26 are possibly performed by air pressure or fluid pressure supplied into the cylinder, and the amount of the dispensed resin from the nozzle 20 depends on for example the distance the piston travels.

However, the typical hot runner system 10 described above has a problem that a fracture on the nozzle 20 will be taken place in part or totally due to unbalance of force applied to the axial direction of the nozzle 20 and a bending stress applied to the nozzle 20 while the manifold 15 is thermally expanded on injecting melted resin into the mold, because an upper portion of the nozzle 20 is firmly fixed to the manifold 15 and a lower portion of the nozzle 20 is fixed to the surface of the mold to inject the melted resin into the inside of the mold using the typical hot runner system 10.

That is to say, there is a problem on the typical hot runner system that a split or fracture on the contact area will be taken place due to a bending stress applied to the nozzle 20 because the balance of force applied from a vertical direction of the nozzle 20 is changed into a horizontal direction of the nozzle 20 when the manifold 15 is thermally expanded by heating of the heater.

SUMMARY OF THE INVENTION

Accordingly, the present invention is to solve the problem above mentioned, and therefore the object of the present invention is to provide the hot runner system for an injection molding machine which is capable of increasing durability of the nozzle by preventing a fracture of the nozzle by maintaining the balance of force applied into the axial direction of the nozzle uniformly irrespective of a volume change of the manifold by the thermal expansion.

To achieve the object of the present invention, the present invention comprises a nozzle combining structure for a hot runner system for injection molding machine comprising: a manifold having a resin injecting hole extending therethrough in its inner portion through which a resin flows and a nozzle seated groove formed in an outer peripheral surface of an end of the resin injecting hole, a nozzle being seated in the groove; a nozzle having a piston guide bushing formed at its upper end inserted into the nozzle seated groove of the manifold, for dispensing the resin injected from the resin injecting hole of the manifold through the piston guide bushing into a mold; a manifold guide bushing for surrounding and threadedly engaging with an upper portion of the piston guide bushing of the nozzle, the upper end of the manifold guide bushing having a diameter smaller than that of the nozzle seated groove of the manifold so that the upper end of the manifold guide bushing is inserted into the nozzle seated groove of the manifold; and a fastening bushing for receiving an outer surface of the manifold guide bushing and threadedly engaging with an inner circumferential surface defining the nozzle seated groove of the manifold so that the manifold guide bushing is fastened by the fastening bushing to the inner circumferential surface defining the nozzle seated groove of the manifold.

In an embodiment, the manifold guide bushing includes a flange with an expanded diameter at a distal end of the manifold guide bushing for surrounding and threadedly engaging with the piston guide bushing at the upper end of the nozzle and the flange is locked on an upper surface of the fastening bushing threadedly mated with the inner circumferential surface defining the nozzle seated groove of the manifold.

In a still another embodiment, the manifold guide bushing includes a plurality of projection for contacting the piston guide bushing at an inner circumferential surface of the manifold guide bushing to reduce a contact area with an outer surface of the piston guide bushing of the nozzle thereby reducing the thermal loss caused by a contact with the piston guide bushing.

Thus the hot runner system for injection molding machine according to the present invention can maintain uniformly the balance of force applied to the axial direction of the nozzle irrespectively of the volume variation of the manifold caused by the thermal expansion thus preventing the break of the nozzle effectively, thereby providing large satisfaction to users by increasing largely durability.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE FOR CARRYING OUT THE INVENTION

Hereinafter, The preferred embodiment of the present invention will be now described in detail with respect to accompanying drawings.

Figure 1:
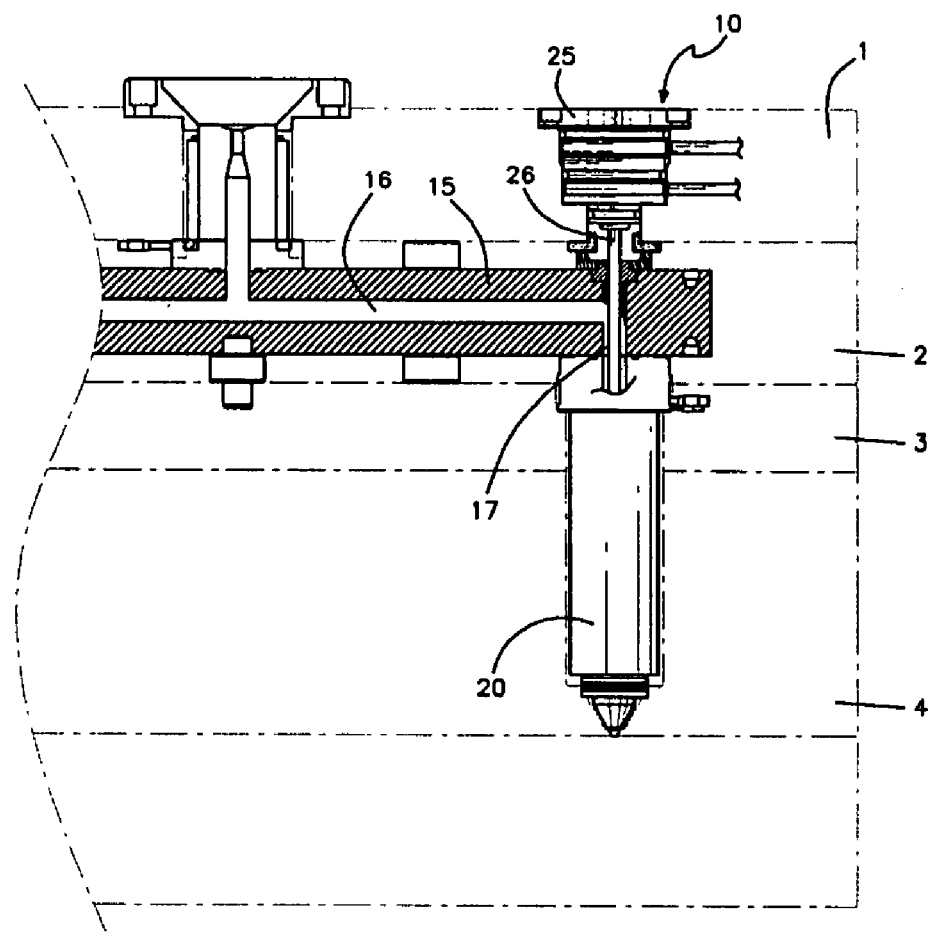
FIG. 1 shows a cross-sectional view of a hot runner system for injection molding machine conventionally used.
Figure 2:
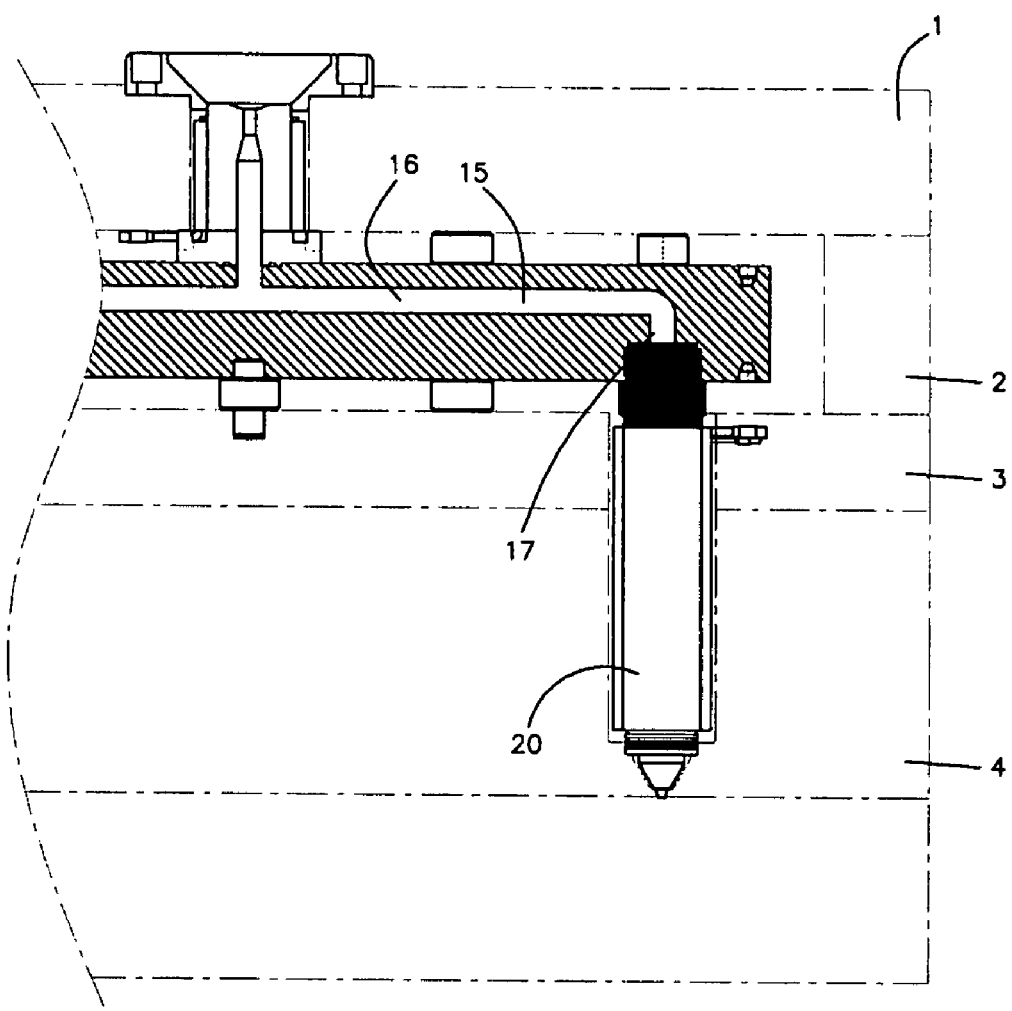
FIG. 2 shows a cross-sectional view of another hot runner system for injection molding machine conventionally used.
Figure 3:
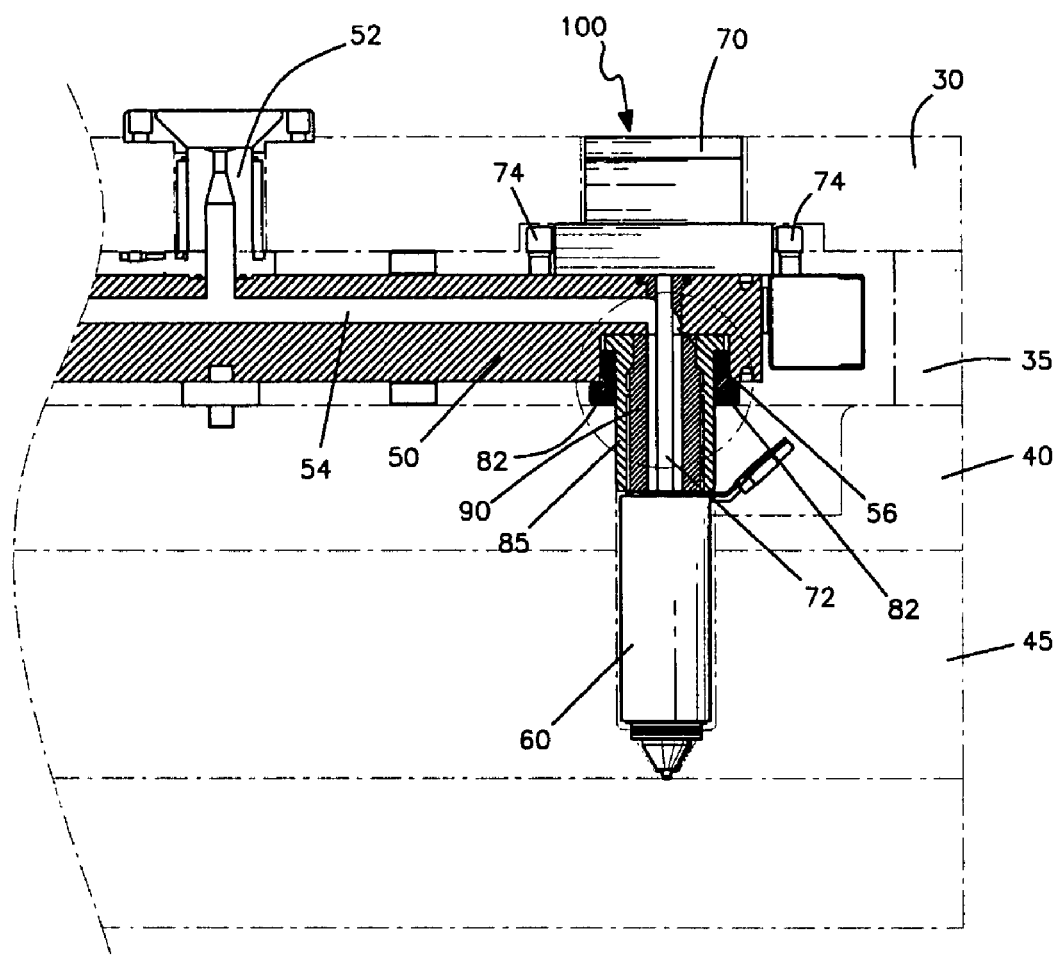
FIG. 3 shows a cross-sectional view of a nozzle combining structure of a hot runner system for injection molding machine according to an embodiment of the present invention.
Figure 4:
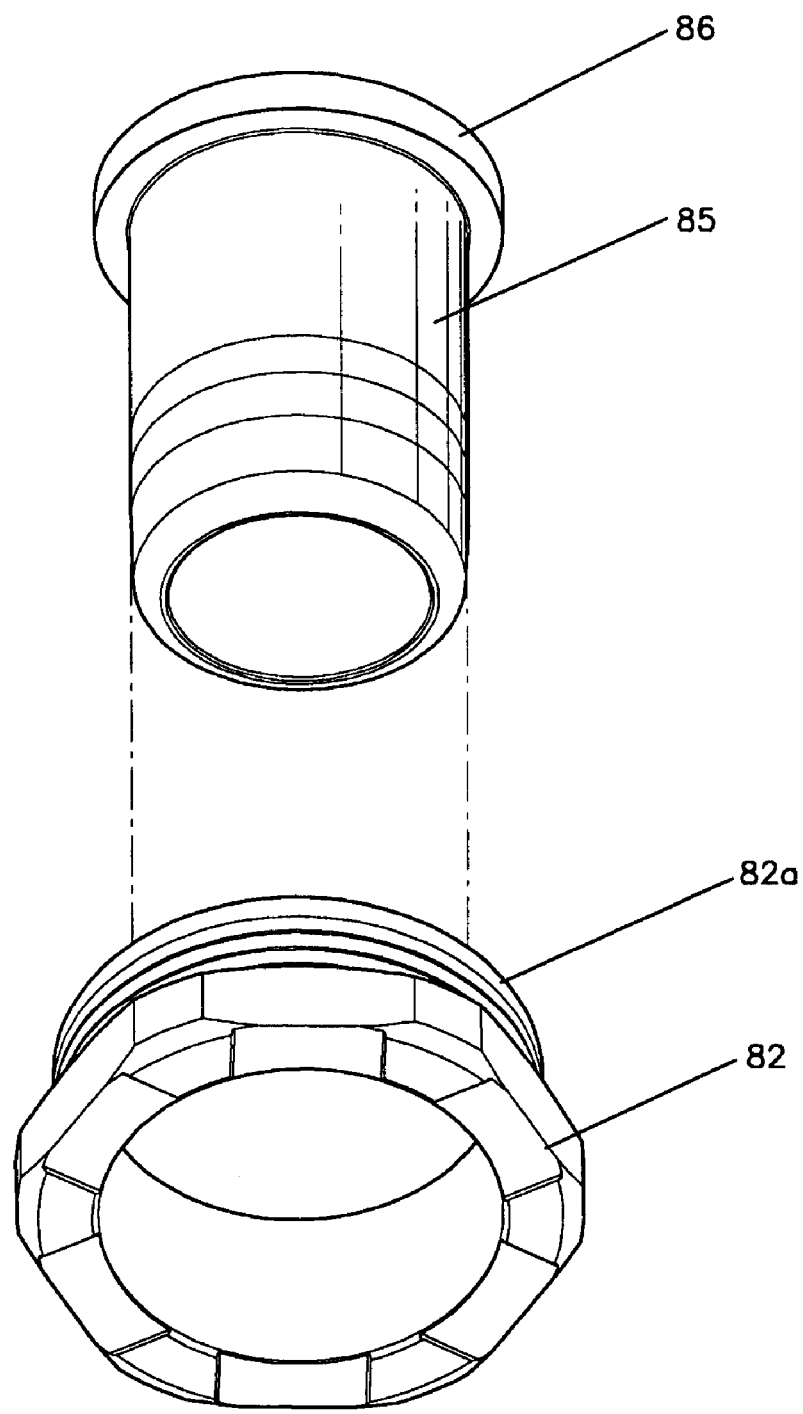
FIG. 4 shows an exploded perspective view of the nozzle combining structure of the hot runner system for injection molding machine according to an embodiment of the present invention.
Figure 5:
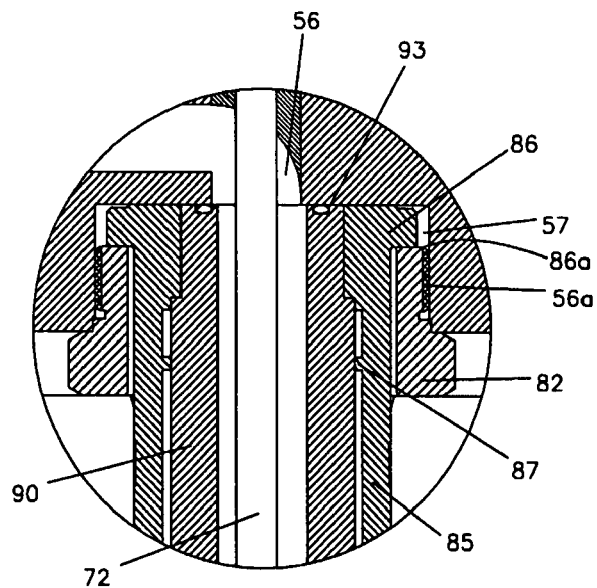
FIG. 5 shows a cross-sectional view of a manifold of the nozzle combining structure of the hot runner system for injection molding machine according to an embodiment of the present invention in which the nozzle is not thermally expanded.
Figure 6:
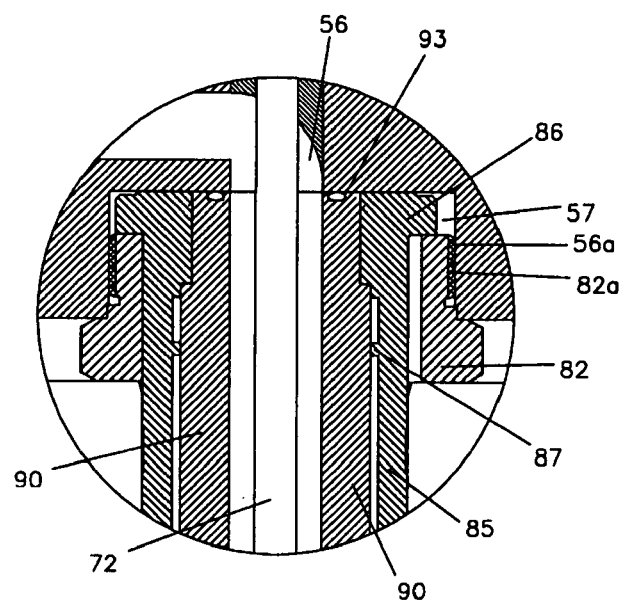
FIG. 6 shows a cross-sectional view of a manifold of the nozzle combining structure of the hot runner system for injection molding machine according to an embodiment of the present invention in which the nozzle is thermally expanded.

FIG. 3 shows a cross-sectional view of a nozzle combining structure of a hot runner system for injection molding machine according to an embodiment of the present invention. FIG. 4 shows an exploded perspective view of the nozzle combining structure of the hot runner system for injection molding machine according to an embodiment of the present invention. FIG. 5 shows a cross-sectional view of a manifold of the nozzle combining structure of the hot runner system for injection molding machine according to an embodiment of the present invention in which the nozzle is not thermally expanded. FIG. 6 shows a cross-sectional view of a manifold of the nozzle combining structure of the hot runner system for injection molding machine according to an embodiment of the present invention in which the nozzle is thermally expanded.

As described in the drawings, the hot runner system 100 for injection molding machine of an embodiment of the present invention is implemented inside a mold in which a plurality of plates comprising a clamping plate 30, a space plate 35, a holding plate 40, and a cavity plate 45 are laminated in this order from the upper side. The hot runner system 100 according to the present invention comprises a manifold 50, a nozzle 60, and a cylinder 70 and further comprises a manifold guide bushing 85 and a fastening bushing 82 for surrounding the nozzle 60 and which are inserted into a groove formed in an end of the manifold 50 so that the nozzle 60 of the hot runner system 100 for injection molding machine is fluidly connected to the manifold 50, according to the present invention.

The mold is a metal structure inside which the hot runner system 100 is implemented, and comprises the clamping plate 30, the space plate 35, the holding plate 40, and the cavity plate 45 to dispense melted resin to several desired sites in this order from the upper side as mentioned above.

These plates of the mold is detachably laminated after subject to respective separate processing and then receive therein the hot runner system 100 to which the nozzle combining structure of the hot runner system 100 according to the present invention is applied.

The manifold 50 of the hot runner system 100 of the present invention is implemented inside the space plate 35 of a plate block and for moving melted resin to supply the melted resin from injection molding machine to several desired sites.

The manifold 50 comprises a nozzle locator 52 at its upper central portion for introducing the melted resin inside the manifold 50.

Also, inside the manifold 50 is formed a resin traveling passage 54 through which the resin introduced from the nozzle locator 52 moved to several desired sites.

The resin traveling passage 54 is in diameter sized according to a dimension of the injection mold and is formed in a grid type inside the manifold 50.

And, at an end of the manifold 50 is formed a resin injecting hole 56 to move the melted resin from the resin traveling passage 54 to the nozzle 60.

Then, a nozzle seated groove 57 with a diameter larger than that of the resin injecting hole 56 is formed at a lower peripheral surface of the end of the manifold 50 so that the nozzle seated groove 57 is inserted by the nozzle 60 to be fluidly connected to the resin injecting hole 56. The nozzle seated groove 57 is in part defined by the inner circumferential surface of the end of the manifold 50 having a thread 56a formed in its inner circumferential surface.

Further, either sides of the manifold 50 is mounted with a heater (not shown) to maintain the resin introduced from the nozzle locator 52 to a temperature of about 180-400° C.

This manifold 50 mentioned above is fluidly connected to the nozzle 60 for dispensing the introduced resin into the mold.

The nozzle 60 is mounted substantially vertically on the manifold 50 for dispensing the resin injected through the resin injecting hole 56 into the mold.

There is a need for a structure for adjusting an amount of the resin dispensed through the nozzle 60 or opening/closing the nozzle 60 after the nozzle 60 is substantially vertically mounted on a lower side of the manifold 50 and thus to do this a cylinder 70 is mounted to a clamping plate 30 positioned at the uppermost side of the plate block.

The cylinder 70 is mounted in an embedded manner inside the clamping plate 30 and comprises a piston 72 which can be raised or lowered inside the nozzle 60 and the manifold 50. The piston 72 can be raised or lowered, for example, by the air supplied to the cylinder 70.

That is, the piston 72 is lowered in case the air is supplied to the upper side of the piston 72 and raised in case the air is supplied to the lower side of the piston 72, because air lines 74 are connected to the upper and lower sides of the cylinder 70 respectively.

Further, in the nozzle 60 is provided a piston guide bushing 90 for guiding a valve piston in case the piston is raised or lowered. The piston guide bushing 90 is formed as a hollow conduit with the central opening therein.

On the one hand, between the inner circumferential surface defining the nozzle seated groove 57 of the manifold 50 and the piston guide bush 90 of the nozzle 60 is mounted a manifold guide bushing 85 for threadedly mating with the piston guide bushing 90.

The outer diameter of the manifold guide bush 85 is less than the diameter of the nozzle seated groove 57 formed in the manifold 50 suitably enough to accommodate corresponding volume change varied by the thermal expansion of the manifold 50.

Also, the inner diameter of the fastening bushing 82 for threadedly mating with the inner circumferential surface defining the nozzle seated groove 57 of the manifold 50 is larger than the outer diameter of the manifold guide bushing 85 enough to receive the longitudinal length change of the manifold guide bushing 85 caused by thermal expansion of the manifold 50 thereby guiding the manifold guide bushing 85 on thermal expansion of the manifold 50.

That is, because the nozzle 60 mounted on the manifold 50 is vertically mounted to the lower surface of the manifold 50, the volume change of the manifold 50 by the thermal expansion takes place longitudinally which results in the torsion stress being caused between the upper and lower ends of the nozzle 60.

Then, the manifold guide bushing 85 has a outer diameter less than the diameter of the nozzle seated groove 57 of the manifold 50 enough to receive a volume change of the manifold 50 thereby guiding the manifold 50 its longitudinal direction, thus preventing the nozzle 60 mounted on the manifold 50 from receiving the large load caused by the volume change of the manifold 50.

The manifold guide bushing 85 is threadedly mated with the upper end of the nozzle 60 and the manifold guide bushing 85 is locked to the manifold 50 by the fastening bushing 82 threadedly mated with the surface defining the nozzle seated groove 57 of the manidfold 50.

The manifold guide bushing 85 is formed as a conduit having a flange 86 with an expanded diameter at its distal end.

The manifold guide bushing 85 is threadedly mated with the piston guide bushing 90 of the nozzle 60.

Also, on the inner circumferential surface of the manifold guide bushing 85 are protruded a plurality of linear projections 87.

The fastening bushing 82 is formed by a conduit in which the manifold guide bushing 85 is fitted, and has a thread 82a formed on its outer surface for mating a thread 56a formed in the surface defining the nozzle seated groove 57 of the manifold 50.

Then, after the fastening bushing 82 is completely mounted into the nozzle seated groove 57, the distal end of the fastening bushing 82 urges the flange 86 of the manifold guide bushing 85 upwardly for constraining the manifold guide bushing 85 so that the manifold guide bushing 85 is no longer played.

Then, it is preferred that a shielding ring 93 for preventing the leak of the resin between the manifold 50 and the piston guide bushing 90 is formed on the upper surface of the piston guide bushing 90 for contacting a surface of the manifold 50 as is well shown in FIGS. 5 and 6.

Now the acting states of the hot runner system 100 for injection mold machine according to the present invention constructed above will be described as follows.

If melted resin is supplied from the injection molding machine, the melted resin is introduced into the resin traveling passage 54 of the manifold 50 through the nozzle locator 52 so that the resin traveled through the resin traveling passage 54 is injected into the mold through the nozzle 60.

At this time, the piston 72 of the cylinder 70 is at a raised height by air pressure or fluid pressure supplied into the inside of the cylinder 70 so that the piston 72 do not interrupt the traveling of the resin into the mold thereby supplying the resin into the mold at high temperature and under high pressure.

By the way, while the resin continues to be supplied into the inside of the mold, the physical volume of the manifold 50 is thermally expanded by the thermal conduction of the high temperature of the resin and the heating of the heater (not shown). At this time, the manifold guide bushing 85 mounted on the upper end of the nozzle 60 guides the manifold 50 to be moved in the axial direction of the manifold 50 in the nozzle seated groove 57 and receives the volume change caused by the thermal expansion of the manifold 50, thereby maintaining still the balance of the force applied into the axial direction of the nozzle 60.

That is, because the flange 86 of the manifold guide bushing 85 has an outer diameter less than the diameter of the nozzle seated groove 57 of the manifold 50 and also the manifold guide bushing 85 has an outer diameter less than the inner diameter of the fastening bush 82 enough to receive the volume change caused by the thermal expansion of the manifold 50, although the volume of the manifold 50 is varied, the margin space between the inner surface defining the nozzle seated groove 57 of the manifold 50 and the manifold guide bushing 85 and between the inner surface of the fastening bushing 82 and the manifold guide bushing 85 receives the thermal volume change of the manifold 50 and guides the manifold 50 in the thermally expanded direction thereby maintaining the balance of the force applied to the axial direction of the nozzle 60.

Also, while the manifold 50 is thermally expanded, the manifold guide bushing 85 not only serves to guide the manifold 50 but also serves to contact the piston guide bushing 90 of the nozzle 60 by a plurality of protruded projections 87 formed in the inner surface of the manifold guide bushing 85 thereby effectively reducing their contact area and thus the thermal loss of the surface of the nozzle 60.

That is, on thermal expansion of the nozzle 60 and the manifold 50, the manifold guide bushing 85 is chilled by air from its surface and therefore if the piston guide bushing 90, i.e. the upper portion of the nozzle 60 is completely in contact with the manifold guide bushing 85, the area dissipating the heat of the resin through the piston guide bushing 90 into the manifold guide bushing 85 is further increased, and therefore the thermal loss of the resin on the surface of the nozzle 60 is larger.

Accordingly, if the area which the projections 87 formed on the inner circumferential surface of the manifold guide bushing 85 and the piston guide bushing 90 of the nozzle 60 contact each other is minimized, the thermal loss of the resin through the nozzle 60 will be largely reduced.

And then, after the resin dispensed through the nozzle 60 is completely filled into the mold, air is introduced into the air line 74 which is fluidly connected to the upper side of the cylinder 70 and then presses the upper surface of the piston 72 which in turn is lowered by air force thereby shielding the resin dispensed through the nozzle 60.

Through above-mentioned processes, the resin is injected steadily into the mold, thereby manufacturing the injection product in a desired form by a manufacturer.

While the hot runner system for ejection molding according to the present invention has been described above, the present invention does not limited to this description and it is noted that the modification and change in its applications may be made possible by a person skilled in the art.

BRIEF DESCRIPTION OF THE MAIN COMPONENTS IN DRAWINGS

50: manifold
56: resin injecting

57: nozzle seated groove
60: nozzle
74: air line
85: manifold guide bushing
86: flange
87: projection

The invention claimed is:

1. A nozzle combining structure for a hot runner system for an injection molding machine comprising:
   a manifold having a resin injecting hole extending therethrough in its inner portion through which a resin flows and a nozzle seated groove formed in an outer peripheral surface of an end of the resin injecting hole, a nozzle being seated in the groove;
   a nozzle having a piston guide bushing formed at its upper end inserted into the nozzle seated groove of the manifold, for dispensing the resin injected from the resin injecting hole of the manifold through the piston guide bushing into a mold;
   a manifold guide bushing for surrounding and threadedly engaging with an upper portion of the piston guide bushing of the nozzle, the upper end of the manifold guide bushing having a flange with an external diameter smaller than that of a diameter of the nozzle seated groove of the manifold to form a first expansion chamber therein whereby when the manifold thermally expands, thermal expansion of the manifold in the axial direction is accommodated within the first expansion chamber; and
   a fastening bushing for receiving an outer surface of the manifold guide bushing and threadedly engaging with an inner circumferential surface defining the nozzle seated groove of the manifold so that the manifold guide bushing is fastened by the fastening bushing to the inner circumferential surface defining the nozzle seated groove of the manifold, and a second expansion chamber formed along a longitudinal length between the fastening bushing and the manifold guide bushing, whereby when the manifold guide bushing thermally expands, thermal expansion of the manifold guide bushing in the axial direction is accommodated within the second expansion chamber.

2. The nozzle combining structure according to claim 1, wherein the manifold guide bushing includes a flange with an expanded diameter at a distal end of the manifold guide bushing for surrounding and threadedly engaging with the piston guide bushing at the upper end of the nozzle and the flange is locked on an upper surface of the fastening bushing threadedly mated with the inner circumferential surface defining the nozzle seated groove of the manifold.

3. The nozzle combining structure according to claim 1 or 2, wherein the manifold guide bushing includes a plurality of projection for contacting the piston guide bushing at an inner circumferential surface of the manifold guide bushing to reduce a contact area with an outer surface of the piston guide bushing of the nozzle thereby reducing a thermal loss caused by a contact with the piston guide bushing.

* * * * *